F. RAWLINS.
MUD GUARD FOR MOTOR AND OTHER ROAD VEHICLES.
APPLICATION FILED NOV. 28, 1913.
1,106,159.
Patented Aug. 4, 1914.
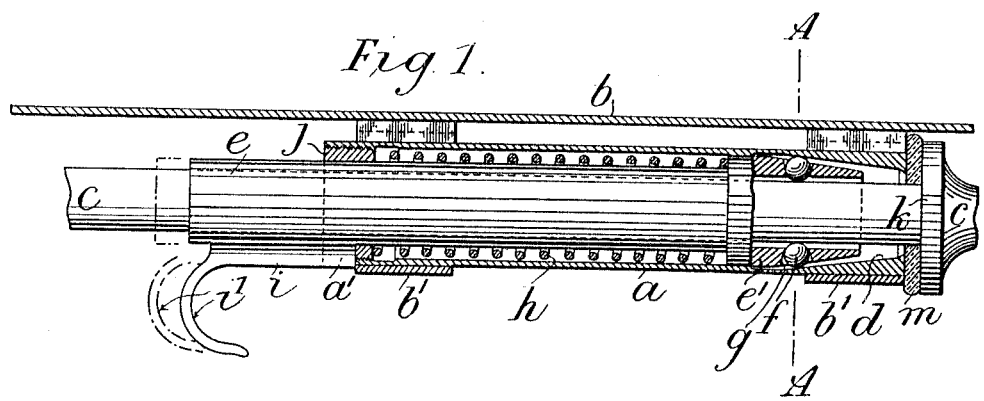
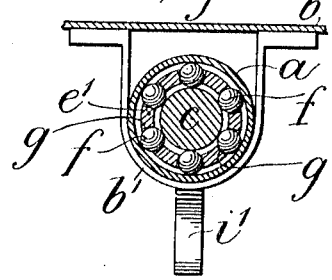
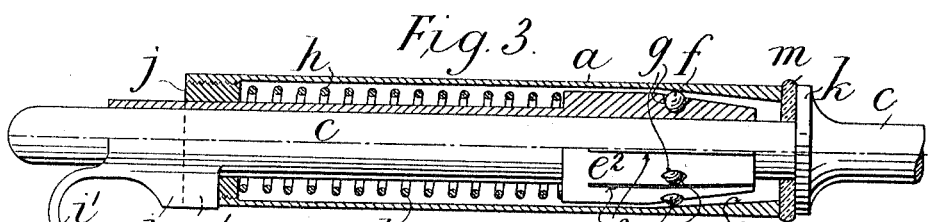
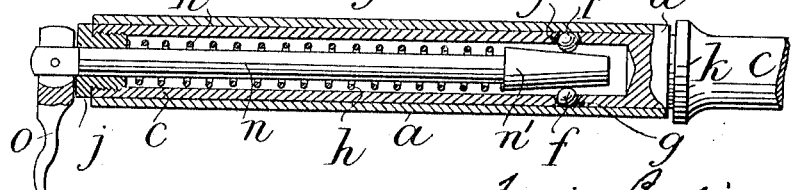

UNITED STATES PATENT OFFICE.

FREDERICK RAWLINS, OF HACKNEY, LONDON, ENGLAND.

MUD-GUARD FOR MOTOR AND OTHER ROAD-VEHICLES.

1,106,159.  Specification of Letters Patent.  Patented Aug. 4, 1914.

Application filed November 28, 1913. Serial No. 803,588.

*To all whom it may concern:*

Be it known that I, FREDERICK RAWLINS, a subject of the King of Great Britain and Ireland, residing at Hackney, in the county of London, England, have invented Improvements in or Relating to Mud-Guards for Motor and other Road-Vehicles, of which the following is a specification.

This invention relates to detachable mud-guards for motor or other road vehicles and it has for its object to provide for the attachment and detachment of a guard in an improved manner, the fastening means being easy to quickly manipulate and very secure in function.

In accordance with the present invention the connection is effected through the agency of composite spigot and socket members between which a frictional grip is obtained by wedging or distention. Conveniently the spigot and socket members may be horizontally disposed so that the mud-guard can be slipped on and off with a sidewise movement, means being provided for producing relative axial movement between the members of the composite spigot or socket necessary to secure release and adapted to hold such members in release position, whereby a mud guard can be manipulated by a single individual when the fastening means are so widely separated or are of such a number as to prevent their being simultaneously held by hand in the release position which would, in the absence of the holding means aforesaid, be necessary to enable the mud guard to be removed.

In the accompanying drawings Figure 1 is a section, taken transversely, of a mud guard to which one arrangement according to the invention is applied. Fig. 2 is a cross section corresponding to the line A—A of Fig. 1. Figs. 3 and 4 are similar views to Fig. 1, showing modifications.

As shown in Figs. 1 and 2, a socket $a$ secured in any suitable manner, as by eyes $b^1$, to the underside of the mud guard $b$ may be arranged to exert a grip upon a spigot constituted by the ordinary bent metal rod or carrier $c$ attached to a motor vehicle for carrying a mud guard. One end of such socket may be tapered internally to a slight extent, as shown as at $d$, so as to become conical, and a sleeve like member $e$ may be mounted therein so as to slide loosely upon the supporting rod $c$. Balls $f$, of say phosphor bronze or steel, may be housed to a greater or lesser extent in the inner end $e^1$ of the movable member $e$, as in conical holes $g$ having their larger diameter outward, the balls $f$ being disposed to engage the internal conical surface $d$ of the socket $a$ and the rod $c$. In order to secure a firm grip between the balls $f$ and the rod $c$, the inner movable member $e$ is acted upon by a spring $h$ tending to force the same into the conical portion $d$ of the socket, the spring bearing against a cap $j$ screwed into the socket. In order to effect release of the mud guard, the inner removable member $e$ with balls $f$ can be retracted against the action of the spring, by any suitable means such as an extension $i$ secured to the member $e$ and provided with a finger piece $i^1$, or by a lever pivoted to the socket $a$, the arrangement being such that while in use the extension $i$ enters a recess at $a^1$ in the socket $a$ and screw cap $j$ while when the member $e$ has been retracted against the action of the spring by the finger piece $i$, both can be turned to cause the extension $i$ to bear against the cap $j$ and hold the member $e$ in the release position. In this way the mud-guard $b$ can be easily manipulated by one person in cases where it may have to be removed from more than one supporting rod $c$, as the fastening device for each supporting rod can be disengaged from the rod and left in the disengaged position. Preferably the supporting rod $c$ is provided with a collar $k$ and with a rubber or like yielding washer $m$ against which the socket $a$ can be forced to assist in releasing the grip of the balls $f$ on the rod $c$.

As a modification, shown in Fig. 3, the inner end $e^2$ of the inner movable member $e$ may be split, as shown at $e^3$, to enable it to expand and contract and be recessed to receive the balls $f$ which, in such case, transmit the grip to the rod $c$ through the split parts of the inner end $e^2$ of the member $e$ in lieu of acting directly upon such rod.

In Fig. 4, a still further modification is shown, the balls $f$ being incorporated in the rod $c$, which is made hollow, and acted upon by the conical end portion $n^1$ of a centrally arranged sliding member $n$ extending through the hollow portion of the rod $c$ and the screw cap $j$ of the socket $a$ so that they can press against the inner surface of a plain cylindrical socket $a$ secured to the mud guard. In this case the member $n$ can be retracted against the action of the spring $h$ by a cam headed lever or trigger $o$ movement of which from the position illustrated into a position in alinement with the socket $a$ will cause it to remain in the latter position and allow the socket to be readily slipped off and on the supporting rod $c$.

By the means described, a mud-guard can be quickly fixed in an immovable position on a vehicle in such a manner as to insure entire absence of rattle or vibration in the securing means such as it is impossible to permanently obtain in cases where screws, bolts, nuts and the like are employed for obtaining easy detachability.

What I claim is:—

1. In combination, a mud guard, a stationary support therefor, means adapted to enable the mud guard to be automatically attached thereto in the act of placing it in position and means adapted to render the automatic attachment at the support inoperative and hold the same in the inoperative position when the mud guard is to be released.

2. In combination, a mud guard, a stationary supporting spigot therefor, a composite socket upon the mud guard adapted to be slipped into automatic gripping contact with the spigot, and means movable in an axial direction to produce displacement between the members of the composite socket to effect release and in a circumferential direction to prevent return of the members from release to gripping position.

3. For enabling a mud guard to be easily applied to and removed from a stationary supporting rod therefor carried by a vehicle, a composite socket comprising another member adapted to be secured to the underside of the mud guard and having a tapered inner end portion, an inner socket member adapted to move endwise within said outer socket and to slide upon the corresponding supporting rod adapted to extend through it, said inner socket carrying at its inner end balls arranged to act against the tapered inner portion of said outer socket and to then grip the supporting rod, and provided at its outer end with a projecting shoulder or abutment adapted upon partial withdrawal of the inner socket from the outer socket and subsequent partial rotation to engage the adjacent outer end of the outer socket and hold the inner socket in its withdrawn position and a spring acting between said outer and inner sockets and surrounding the latter and serving to cause it to automatically return to its operative position when disengaged from the end of the outer socket.

Signed at London, England, this 13th day of November, 1913.

FREDERICK RAWLINS.

Witnesses:
H. D. JAMESON,
W. E. ROGERS.